United States Patent
Zhang

(10) Patent No.: US 8,300,397 B2
(45) Date of Patent: Oct. 30, 2012

(54) ELECTRONIC DEVICE WITH ACCESS STRUCTURE FOR HARD DISC DRIVE

(75) Inventor: Shuai Zhang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 267 days.

(21) Appl. No.: 12/912,767

(22) Filed: Oct. 27, 2010

(65) Prior Publication Data
US 2012/0050979 A1 Mar. 1, 2012

(51) Int. Cl.
*G06F 1/16* (2006.01)

(52) U.S. Cl. ........... 361/679.33; 360/923; 360/98.08; 248/636; 312/223.2

(58) Field of Classification Search .......... 307/9.1, 307/38; 361/679.02, 679.33, 679.34, 679.06, 361/679.46, 679.36, 679.37, 679.39, 690, 361/747, 728; 713/320; 248/672, 316.7, 248/310, 636, 27.3, 634, 615, 201, 220.31, 248/221.11; 360/97.19, 75, 256.2, 244.8, 360/923, 78.04, 98.08, 99.23, 133; 345/156, 345/588, 172, 76; 439/540.1, 752, 853, 135; 312/223.2, 223.3, 331.2, 244, 270.3, 30, 312/45, 333

See application file for complete search history.

(56) References Cited

U.S. PATENT DOCUMENTS

| | | | |
|---|---|---|---|
| 6,101,097 A * | 8/2000 | Foo et al. | 361/727 |
| 7,786,613 B2 * | 8/2010 | Hamaoka et al. | 307/9.1 |
| 8,023,258 B2 * | 9/2011 | Chen et al. | 361/679.33 |

* cited by examiner

*Primary Examiner* — Hung Duong
(74) *Attorney, Agent, or Firm* — Altis Law Group, Inc.

(57) ABSTRACT

An electronic device includes a main body, two positioning members, a cover, at least one positioning post, and at least one latching member. The main body includes a first casing, a second casing, and a HDD. The second casing defines an opening, from which the HDD is capable of being placed into and removed from the electronic device. The positioning members protrude from the first casing. The cover is rotatably connected to the positioning members. When the cover is rotatable to be received in the opening, the cover and the positioning members cooperatively define a receiving space to receive the HDD. Each of the at least one positioning post perpendicular extends from one of the positioning members. Each of the at least one latching member is rotatably connected to the cover and includes a hook capable of engaging with at least one of the positioning post to latch the cover.

8 Claims, 6 Drawing Sheets

ELECTRONIC DEVICE WITH ACCESS STRUCTURE FOR HARD DISC DRIVE

BACKGROUND

1. Technical Field

The present disclosure relates to electronic devices and, particularly, to an electronic device with an access structure for conveniently handling a hard disc drive therein.

2. Description of Related Art

Notebook computers have become part of everyday life. In the process of updating and maintaining hard disk drives of the notebooks, the whole bottom cover needs to be opened, which is troublesome.

BRIEF DESCRIPTION OF THE DRAWINGS

The components of the drawings are not necessarily drawn to scale, the emphasis instead being placed upon clearly illustrating the principles of an electronic device with an access structure for handling a hard disc drive. Moreover, in the drawings, like reference numerals designate corresponding parts throughout several views.

DETAILED DESCRIPTION

Figure 1:
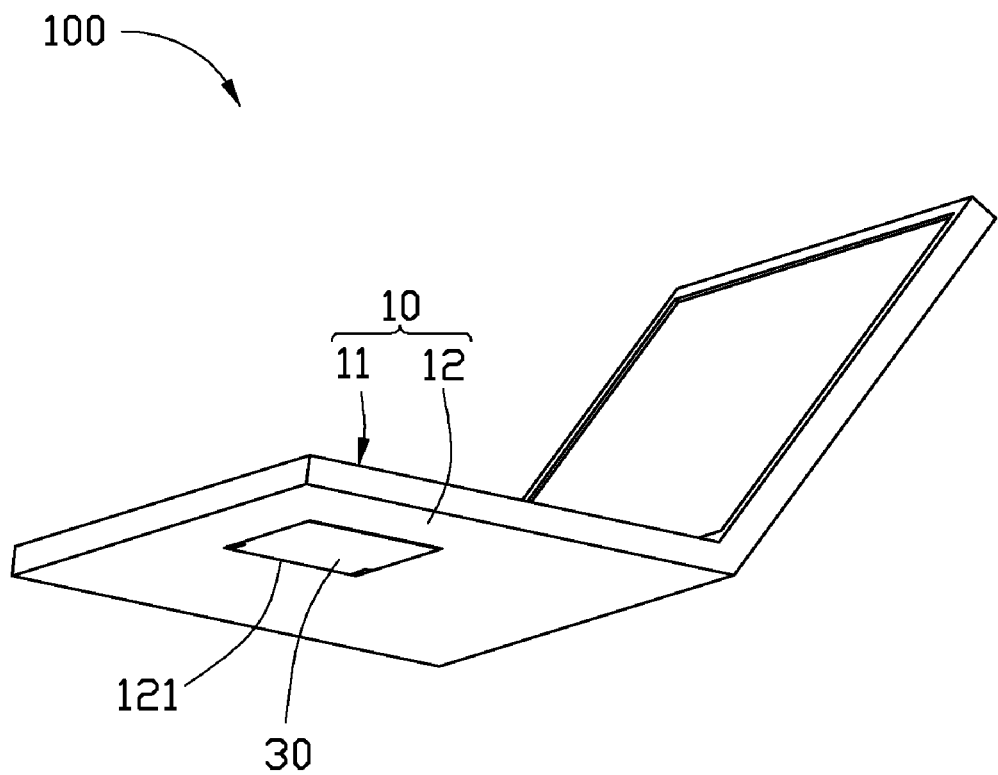
FIG. 1 is an isometric view of an electronic device in accordance with an exemplary embodiment
Figure 2:
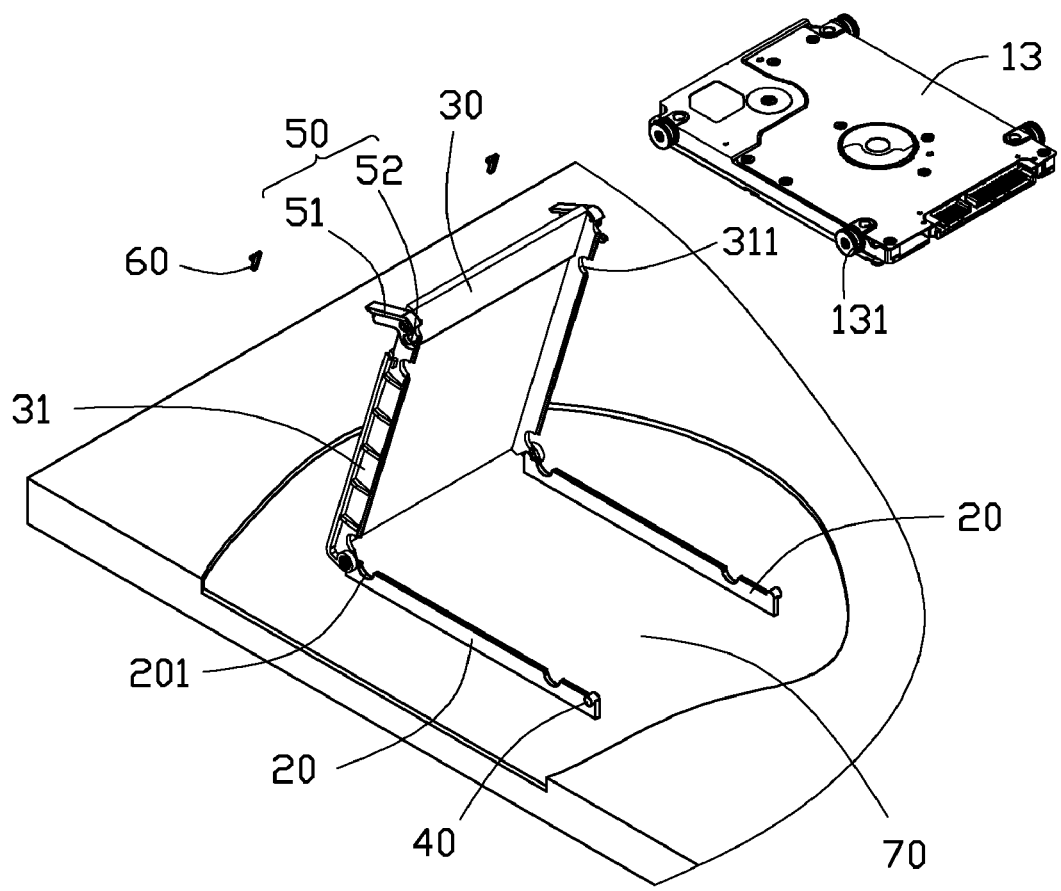
FIG. 2 is a partial, exploded, perspective view of the electronic device of FIG. 1, showing a hard disc drive of the electronic device.

Referring to FIGS. 1-2, an electronic device 100 includes a main body 10. The electronic device 100 can be a notebook computer, an e-book, or a portable music player. In the embodiment, the electronic device 100 is a notebook computer. The main body 10 includes a first casing 11 and a second casing 12 cooperatively forming an interior space to accommodate electronic components (not shown). The main body 10 further includes a hard disc drive (HDD) 13. The second casing 12 defines an opening 121, through which the HDD 13 can be placed into or can be removed from the electronic device 100. In this embodiment, the opening 121 is substantially rectangular. Each of opposite sidewalls of the HDD 13 includes at least one projection 131 for securing the HDD 13 to the main body 10. In the embodiment, two projections 131 protrude from each of the opposite sidewalls of the HDD 13. In order to prevent the HDD 13 from impact, the projections 131 may be made of rubber material.

The electronic device 100 further includes two positioning members 20, a cover 30, at least one positioning post 40, at least one latching member 50, and a resisting member 60. The positioning members 20 protrude from a lower surface 111 of the first casing 11 and are arranged below the opening 121. In the embodiment, the positioning members 20 are parallel to each other and are substantially bar-shaped. The distance between the positioning members 20 are substantially equal to the width of the opening 121, the length of each positioning member 20 is substantially equal to the length of the opening 121. Each positioning member 20 defines at least one first concave 201 adapted to receive a portion of one projection 131. In the embodiment, each positioning member 20 includes two first concaves 201.

Figure 4:
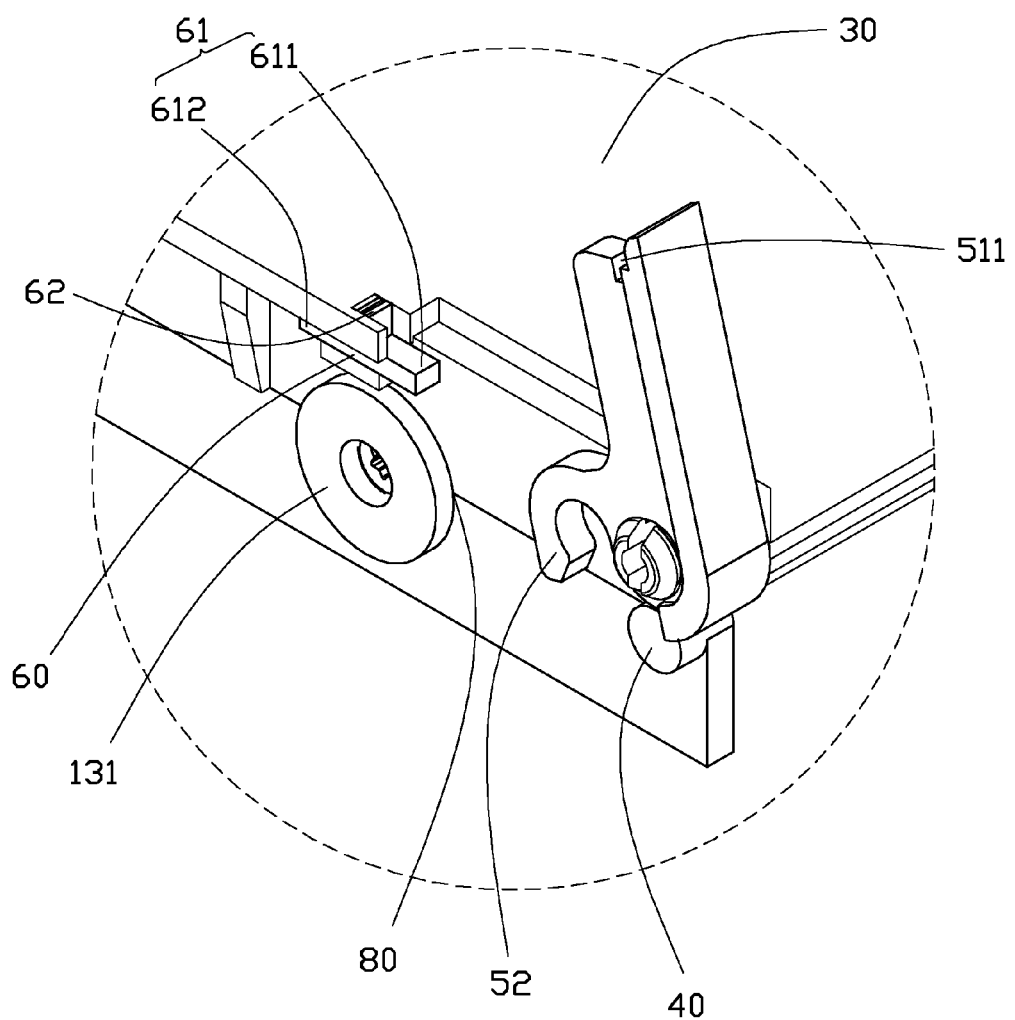
FIG. 4 is an enlarged view of the circled portion IV of FIG. 3.
Figure 5:
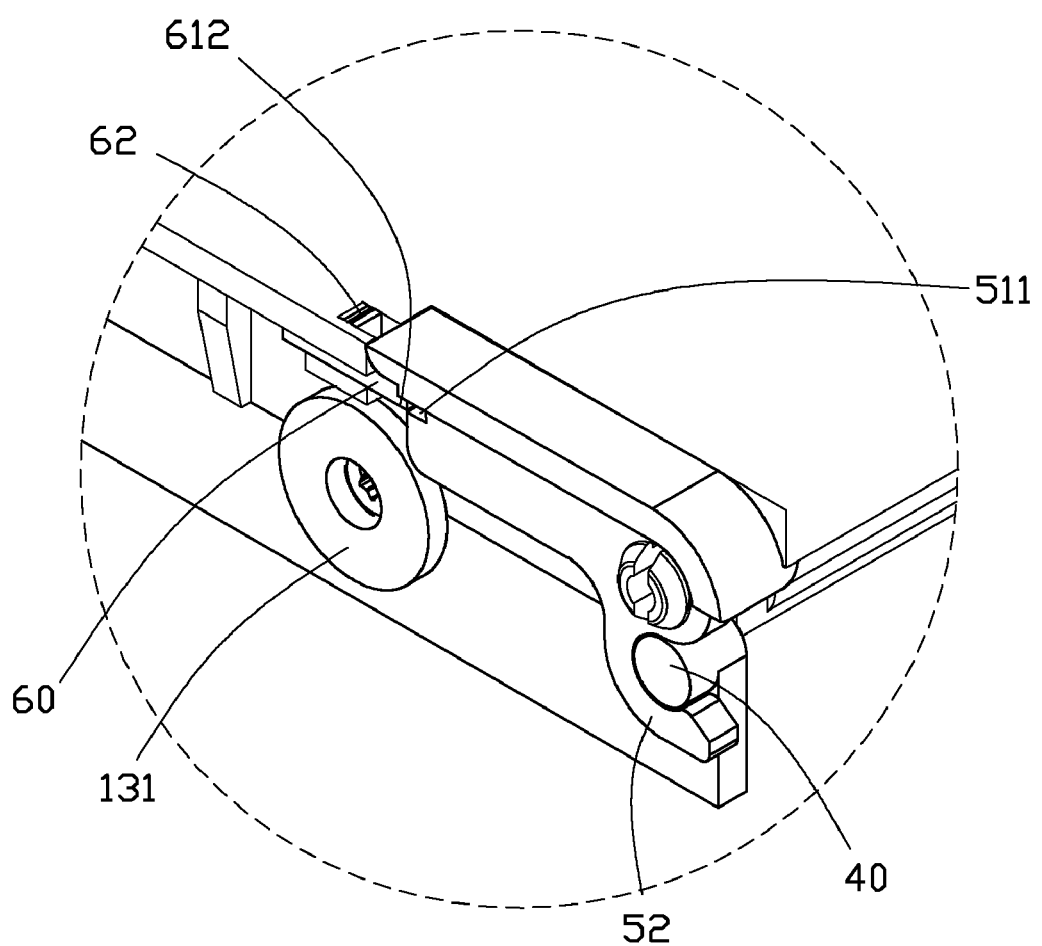
FIG. 5 is similar to FIG. 4, but showing a second state of the electronic device.
Figure 6:
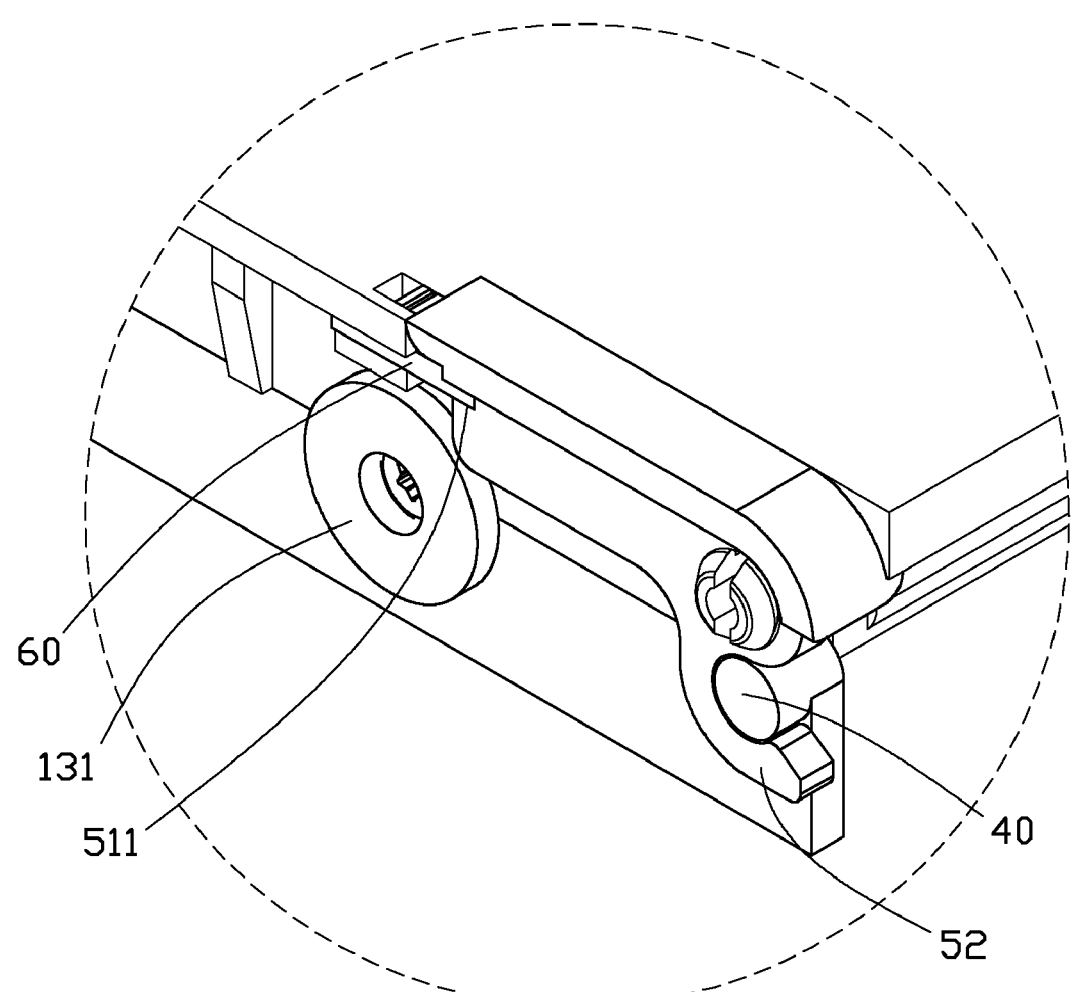
FIG. 6 is similar to FIG. 4, but showing a third state of the electronic device.

One end of the cover 30 is rotatably connected to one end of each positioning member 20. The shape of the cover 30 is adapted to the opening 121, so the cover 30 can be rotated and can be received in the opening 121. When the cover 30 is rotated to be received in the opening 121, the cover 30 and the positioning members 20 cooperatively form a first receiving space 70 to receive the HDD 13. The cover 30 includes two opposite sidewalls 31 extending along the length of the cover 30. Each sidewall 31 defines at least one second concave 311, and each second concave 311 and one first concave 201 cooperatively form a second receiving space 80 (see FIG. 4) to accommodate one projection 131.

In the embodiment, two positioning posts 40 are deployed, and each positioning post 40 protrudes from a sidewall of each positioning member 20 and is opposite to the first receiving space 70. In this embodiment, the positioning posts 40 are substantially cylindrical.

In this embodiment, two latching members 50 are deployed, and each is rotatably connected to a free end of one sidewall 31. Each latching member 50 includes a main body 51 and a hook 52 extending from an end of the main body 51. An opposite end of the main body 51 defines a latching slot 511 to receive the resisting member 60. In the embodiment, the hook 52 is arc-shaped, and the size of which is larger than a half circle. The hook 52 hooks a portion of the positioning post 40.

Figure 3:
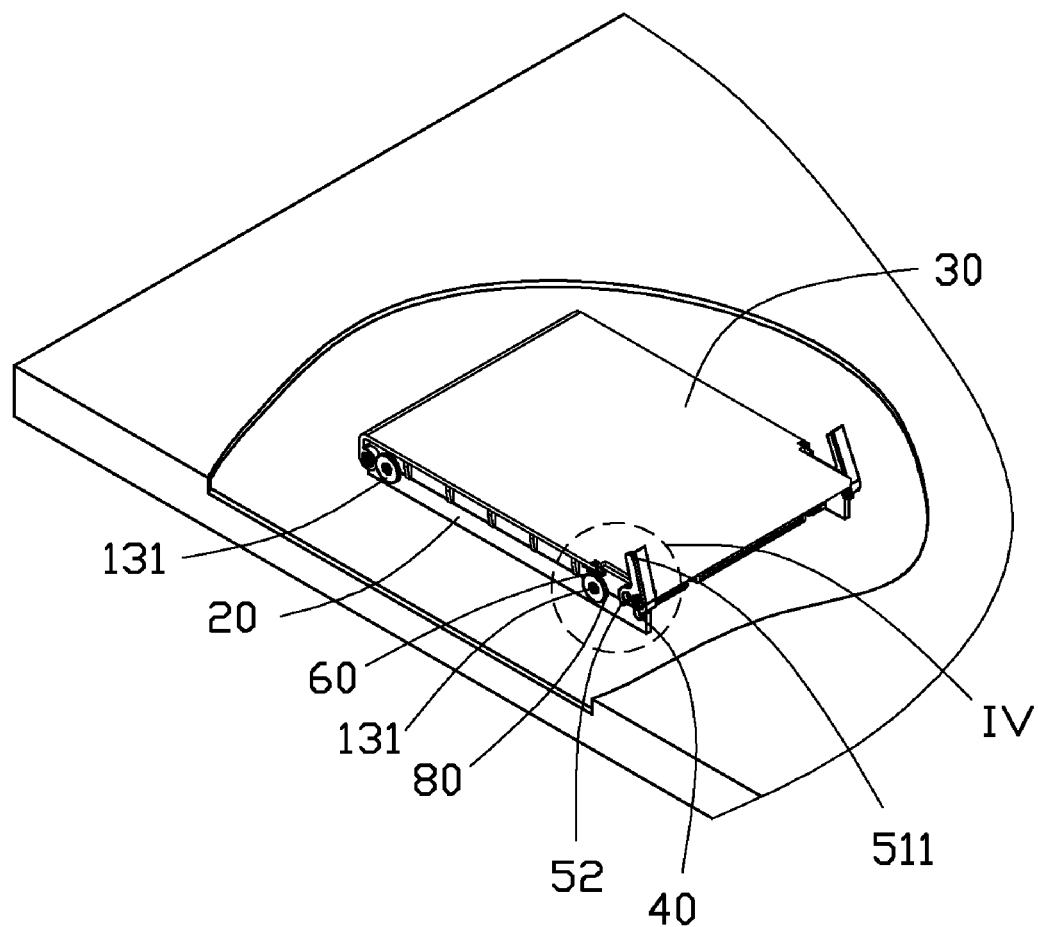
FIG. 3 is a partial, isometric view of the electronic device of FIG. 1, showing a first state of the electronic device.

In the embodiment, two resisting members 60 are employed, and each resisting member 60 is moveably connected to the sidewall 31. Each resisting member 60 is inverted and substantially T-shaped, and includes a base 61 and a resisting block 62. The resisting block 62 is substantially perpendicularly secured to the base 61 to divide the base 61 into a first end 611 (see FIG. 3) and a second end 612 (see FIG. 3). The first end 611 is slidably connected to the sidewall 31. The second end 612 can be received in the latching slot 511. The resisting block 62 is operable through the opening 121, and users can push the resisting block 62 to slide the base 61, causing the second end 612 to be engaged with and disengaged from the latching slot 511. In this embodiment, the free end of the resisting block 62 is flush with the surface of the cover 30.

Referring to FIGS. 3-6, to assemble the HDD 13, the HDD 13 is placed on the positioning members 20, causing a part of the projections 131 to be received in the first concaves 201. The cover 30 is then rotated to cover the HDD 13, causing the second concaves 311 to receive the remaining of the projections 131, thus the HDD 13 is limited within the first receiving space 70. The latching member 50 is rotated to drive the hook 52 to hook the positioning post 40. The resisting member 60 is then pushed to cause the second end 612 to be received in the latching slot 511. At this point, the cover 30 is latched to the positioning members 20, and the HDD 13 is fixed.

To remove the HDD 13, the resisting member 60 is pushed toward an opposite direction to bring the second end 612 to disengage from the latching slot 511. The latching member 50 is then rotated to cause the hook 52 to disengage from the positioning post 40. At this point, the cover 30 can be rotated to be in an open state, and the HDD 13 can be removed.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
a main body comprising a first casing, a second casing, and a hard disc drive (HDD), the second casing defining an opening through which the HDD is capable of being placed into and removed from the electronic device;
two positioning members protruding from a lower surface of the first casing, parallel to each other, and arranged below the opening;
a cover rotatably connected to the positioning members and capable of being rotated to be received in the opening, when the cover being rotated to be received in the opening, the cover and the positioning members cooperatively defining a first receiving space to receive the HDD;
at least one positioning post, each of the at least one positioning post extending from one of the positioning members; and
at least one latching member, each of the at least one latching member rotatably connected to one of opposite sidewalls of the cover and comprising a hook capable of engaging with one of the at least one positioning post to latch the cover to the main body.

2. The electronic device as described in claim 1, wherein each of the at least one hook is arc-shaped and the size of each of the at least one hook is larger than a half circle.

3. The electronic device as described in claim 1, further comprising at least two projections protruding from HDD, wherein each of the positioning members defines at least one first concave, the cover defines at least two second concaves corresponding to the first concaves, each of the first concaves and one of the second concaves cooperatively define a second receiving space to receive one of the projections.

4. The electronic device as described in claim 3, wherein the projection is made of rubber material.

5. The electronic device as described in claim 1, further comprising at least one resisting member, wherein each of the at least one resisting member comprises a first end slidably connected to the cover and a second end, the latching member further comprises a latching slot to receive one of the at least one second end.

6. The electronic device as described in claim 5, wherein each of the at least one resisting member further comprises a resisting block and a base, the resisting block divides the base into a first end and the second end.

7. The electronic device as described in claim 5, wherein the shape of the resisting member is T-shaped.

8. The electronic device as described in claim 6, wherein the resisting block is operable through the opening.

* * * * *